United States Patent [19]
Kuniyoshi et al.

[11] 3,985,954
[45] Oct. 12, 1976

[54] DC LEVEL CONTROL CIRCUIT

[75] Inventors: Yasunobu Kuniyoshi, Tokyo; Takao Tsuchiya, Fujisawa, both of Japan

[73] Assignee: Sony Corporation, Tokyo, Japan

[22] Filed: Apr. 17, 1975

[21] Appl. No.: 568,783

[30] Foreign Application Priority Data
Apr. 19, 1974 Japan.................. 49-43994

[52] U.S. Cl. .................. 178/7.3 DC; 178/DIG. 26; 307/235 T; 307/237; 307/264
[51] Int. Cl.² ...................... H04N 5/18; H03K 5/08
[58] Field of Search ................ 307/237, 235 T, 264; 328/173, 169, 146; 178/DIG. 26, 7.3 DC, 7.5 DC; 330/11

[56] References Cited
UNITED STATES PATENTS
3,207,998  9/1965  Corney et al. .................. 330/11
3,557,305  1/1971  Dann .......................... 178/7.3 DC Primary Examiner—John Zazworsky
Assistant Examiner—Marcus S. Rasco
Attorney, Agent, or Firm—Lewis H. Eslinger; Alvin Sinderbrand

[57] ABSTRACT

A DC level control circuit wherein the DC level of an input signal is compared to a reference level and a DC bias potential is varied in accordance with said comparison, the varied bias potential being fed back to correspondingly vary the DC level input signal.

5 Claims, 7 Drawing Figures

DC LEVEL CONTROL CIRCUIT

BACKGROUND OF THE INVENTION

This invention relates to a DC level control circuit and, more particularly, to a clamping or DC restoration circuit which finds ready application in television signal receiving apparatus.

Clamping circuits are generally used to fix or "clamp" a given signal to a preselected DC level. By the use of such clamping circuits, the information contained in the varying portion of such given signal is not affected by the DC reference level is changed. In a typical application of a clamping circuit, the DC component of a television signal is restored after the television signal is subjected to various stages of processing in a television receiver. Since the DC level of a video signal is used to represent the brightness of a reproduced video picture and is additionally used as a reference level for detecting the synchronizing signal pulses included therein, it often is necessary to re-insert into the video signal the DC level which is removed by various video amplifiers. This, of course, corrects for a loss in the brightness level of the reproduced picture and, additionally, enables the synchronizing signal pulses to be properly detected.

In a conventional clamping circuit of simplified construction, a capacitor is connected to a diode rectifier which is poled in a direction whereby the capacitor is permitted to charge to a peak value of the video input signal. Generally, the synchronizing signal pulse of a video signal is the negative peak value of the video signal. Accordingly, the diode may be poled in a direction to permit the capacitor to charge to this negative peak value. During information periods between the synchronizing signal pulses, the output signal obtained across the diode is of the same shape as the input video signal, but now has its DC level displaced in accordance with the negative peak value stored by the capactior. Thus, the synchronizing signal peaks are fixed or "clamped" to a predetermined level determined by the bias which might be applied to the rectifier diode.

The aforedescribed conventional clamping circuit is not provided with any signal feedback. Thus, the stability of this circuit to clamp or restore the DC level of the video signal is less than perfect. Moreover, the conventional circuit is deleteriously influenced by variations in temperature, resulting in non-uniform DC clamping levels. Furthermore, since capacitors must be connected in series in the video signal path, it is often difficult to design the conventional clamping circuit in integrated circuit configuration.

OBJECTS OF THE INVENTION

Therefore, it is an object of the present invention to provide an improved clamping circuit having a feedback path.

Another object of this invention is to provide a DC level control circuit wherein the DC level of an input signal is varied in accordance with differences between the input signal level and a reference level.

A further object of this invention is to provide an improved DC level control circuit which can be used in combination with a synchronizing signal separator circuit.

An additional object of this invention is to provide an improved clamping circuit for clamping the synchronizing signal peaks of an input video signal to a predetermined level.

Yet another object of this invention is to provide an improved DC level control circuit that is not unduly influenced by variations in temperature.

Various other objects and advantages of the invention will become apparent from the forthcoming detailed description and the novel features will be particularly pointed out in the appended claims.

SUMMARY OF THE INVENTION

In accordance with the present invention, a DC level control circuit is provided wherein a comparison circuit serves to compare the DC level of an input signal to a reference level; and a feedback is established between the comparison circuit and an input circuit to supply a varying DC bias potential to the input signal as a function of the comparison between the input signal DC level and the reference level, to correspondingly vary the input signal level to maintain a substantially uniform DC level. In one embodiment of this invention, the input signal is a video signal and the synchronizing pulse peaks are compared to the reference level to thereby maintain a substantially uniform synchronizing pulse level.

BRIEF DESCRIPTION OF THE DRAWINGS

The following detailed description will best be understood in conjunction with the accompanying drawings in which.

DETAILED DESCRIPTION OF CERTAIN ONES OF THE PREFERRED EMBODIMENTS

Figure 1:
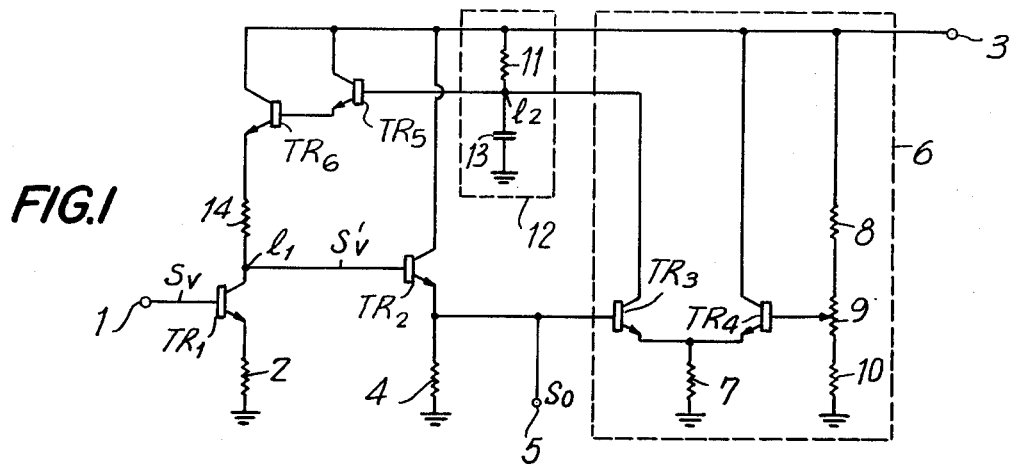
FIG. 1 is a schematic diagram of a DC level control circuit in accordance with this invention.

Referring to the drawings, wherein like reference numerals are used throughout, and in particular to FIG. 1, there is schematically illustrated one embodiment of the DC level control circuit in accordance with this invention. The level control circuit is formed of an input circuit including a transistor $TR_1$, a comparison circuit 6 which is coupled to the input circuit by a buffer amplifier including an emitter-follower transistor $TR_2$, and a feedback circuit interconnected between the comparison circuit 6 and the input circuit, the feedback circuit including a source of DC bias potential 12 and cascaded transistors $TR_5$ and $TR_6$. The transistor $TR_1$ included in the input circuit is connected as an inverting amplifier having its base electrode connected to an input terminal 1, its emitter electrode coupled to a reference potential, such as ground, by an emitter resistor 2 and its collector electrode connected to a collector load resistor 14.

The output of the amplifying transistor $TR_1$ is coupled through the emitter-follower amplifier to the comparison circuit 6. As shown, the emitter-follower amplifier comprises an emitter-follower transistor $TR_2$ having its collector electrode coupled directly to a source of operating potential supplied to a terminal 3 and its emitter electrode coupled to ground through an emitter load resistor 4. In addition to being connected to the comparison circuit 6, the output of the emitter-follower amplifier is coupled to an output circuit represented by the output terminal 5.

The comparison circuit 6 is adapted to compare the level of the signal supplied thereto by the buffer amplifier with a reference level. Accordingly, in the illustrated embodiment the comparison circuit is formed of a differential amplifier including the differentially-connected transistors $TR_3$ and $TR_4$ having their emitter electrodes connected in common, the common-connected emitters being coupled to ground by a resistor 7. Although shown as only a pair of differentially-connected transistors, it is appreciated that the differentially-connected stages may be comprised of plural transistors and, moreover, the differential amplifier may include several stages of differential amplification, as is conventional. The transistor $TR_3$ is adapted to receive the input signal supplied thereto through the buffer amplifier and the transistor $TR_4$ is adapted to receive the reference level. The reference level is a predetermined DC level which may be derived by the voltage divider circuit formed of series-connected resistors 8, 9 and 10. This voltage divider circuit is coupled across the source of operating potential to produce a reference DC voltage which is proportional to the operating potential. Preferably, the base electrode of the transistor $TR_4$ is connected to the variable tap of a potentiometer 9 to thereby facilitate changes in the reference level, as desired.

The collector electrode of the transistor $TR_4$ is shown as being connected directly to the source of operating potential and the output of the comparison circuit 6 is obtained from the collector electrode of the transistor $TR_3$. Accordingly, the output of the comparison circuit 6 is connected to the source of DC bias potential 12. As shown, the bias potential source 12 is comprised of a resistor 11 connected in series with a storage capacitor 13, the junction $l_2$ defined by these components being connected to the collector electrode of the transistor $TR_3$. It may be appreciated that, because of the storage capacitor 13, the bias potential source 12 comprises a time constant circuit. In particular, the capacitor 13 is adapted to be charged through the resistor 11 from the source of operating potential at a rate determined by the resistance of the resistor 11 and the capacitance of the capacitor 13. As will soon be described, the voltage stored by the capacitor 13 is adapted to be discharged through the transistor $TR_3$ when the transistor is rendered conductive. The rate of discharge of the capacitor 13 is a function of the capacitance thereof and the collector-emitter impedance of the transistor $TR_3$.

The bias potential supplied by the bias potential source 12 is equal to the voltage across the capacitor 13 and, therefore, the output of the source 12 is taken from the junction $l_2$. As shown, this output of the bias potential source is coupled through the cascaded transistors $TR_5$ and $TR_6$ through the resistor 14 to the input of the emitter-follower buffer amplifier transistor $TR_2$. Thus, the feedback path between the bias potential source 12 and the input to the buffer amplifier, i.e., the collector electrode of the input transistor $TR_1$, includes the base-emitter junction of the transistor $TR_5$ and the base-emitter junction of the transistor $TR_6$. The purpose of these transistors will be described hereinbelow.

Figure 2A:
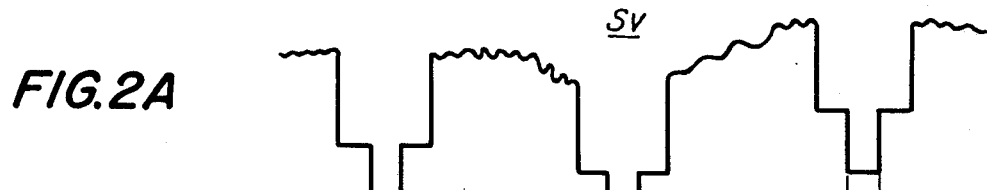
FIG. 2A–2D illustrate waveform representations produced by various components of the circuit shown in FIG. 1.
Figure 2B:
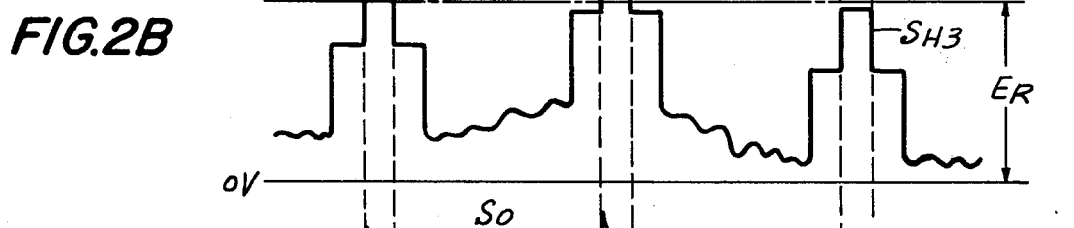
Figure 2C:
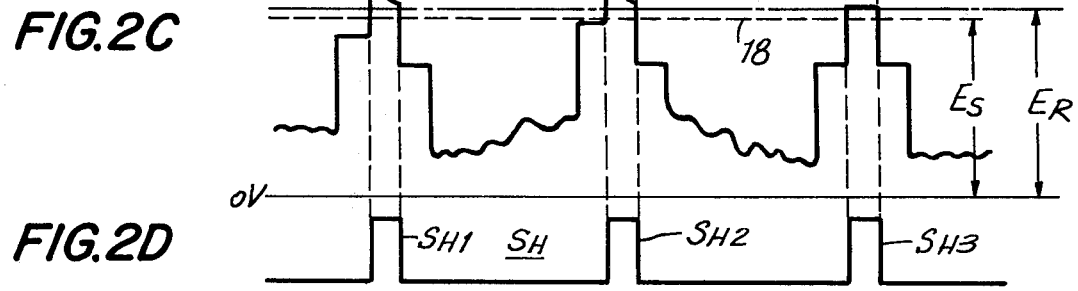

The operation of the DC level control circuit shown in FIG. 1 will best be understood by referring to the waveform diagrams depicted in FIGS. 2A–2C. Furthermore, to facilitate a ready understanding of the principles of this invention, the operation thereof will be described with reference to a particular application wherein the DC level of an input video signal is controlled. Accordingly, let it be assumed that a video signal $S_v$ having a video signal information portion and periodic synchronizing signal pulses is applied to the input terminal 1. The waveform of this video signal is represented in FIG. 2A wherein the synchronizing signal pulses are assumed to be negative-going peak levels. Let it be further assumed that the level control circuit, and in particular the bias potential source 12 and feedback circuit path, is not operating. Accordingly, the video signal $S_v$ applied to the input transistor amplifier $TR_1$ causes a signal current to flow through the transistor which is proportional to the waveform of the input video signal. A voltage $S_v'$ is produced at the output of the transistor amplifier, such as at the collector electrode $l_1$, having a waveform depicted in FIG. 2B. As is apparent, the amplified video signal output $S_v'$ is inverted with respect to the input video signal $S_v$. This amplified video signal $S_v'$ is coupled through the buffer amplifier $TR_2$ and is applied to the comparison circuit 6. It has been assumed that the DC level of the input video signal, and thus the DC level of the amplified, inverted video signal $S_v'$, has been affected by, for example, previous stages of amplification (not shown) such that the illustrated synchronizing pulses $S_{H1}$, $S_{H2}$ and $S_{H3}$ are not uniform in height. That is, the peak levels of the illustrated synchronizing pulses vary with respect to each other. It may be observed that this variation in the DC level of the video signal will impede the accurate detection of synchronizing pulses and, moreover, will deleteriously affect the brightness and information content of a video picture which might be displayed in response to the video signal.

Accordingly, it is a function of this invention to restore the proper DC level to the input video signal $S_v$ (or to the inverted amplified version $S_v'$ thereof). More particularly, the circuit illustrated in FIG. 1 serves to clamp the synchronizing pulse peaks to a predetermined voltage level, such as a reference level $E_R$. This is achieved by detecting the difference between each of the synchronizing pulse peaks $S_{H1}$, $S_{H2}$ and $S_{H3}$ and the reference level $E_R$ which is derived from the voltage divider circuit and applied to the base of the transistor $TR_4$. By reason of the differential operation of the differential amplifier included in the comparison circuit 6, if the signal applied to the transistor $TR_3$ exceeds the voltage $E_R$ applied to the transistor $TR_4$, then the transistor $TR_3$ is rendered conductive. Conversely, if the voltage applied to the transistor $TR_3$ falls below the reference level $E_R$, then the transistor $TR_3$ is rendered non-conductive. Moreover, the degree of conductivity of the transistor, and thus its collector-emitter impedance, is a function of the magnitude of the difference between the voltage applied thereto and the reference level $E_R$.

Let it be assumed that the synchronizing pulse level of the video signal $S_v'$ supplied to the comparison circuit 6 by the buffer amplifier is less than the reference voltage $E_R$, as represented by the synchronizing pulse $S_{H3}$ of FIG. 2B. Accordingly, the transistor $TR_3$ is not conducting and no discharge path is provided therethrough for the capacitor 13. Consequently, the capacitor 13 is permitted to charge through the resistor 11 to a voltage level which is substantially equal to the operating potential. The voltage stored by the capacitor 13 is transmitted through the base-emitter junctions of the transistors $TR_5$ and $TR_6$ to the input of the buffer amplifier transistor (the output of the input amplifier transistor) $l_1$. Thus, a DC bias potential is fed back to the video signal $S_v{'}$ which here is additively combined with the video signal. This added DC bias potential has the effect of increasing the DC level of the video signal $S_v{'}$ so that the synchronizing pulse peak $S_{H3}$ is increased toward the reference level $E_R$.

Let it now be assumed that a synchronizing pulse of the video signal $S_v{'}$ is greater than the reference level $E_R$, as depicted by the synchronizing pulse $S_{H1}$ of FIG. 2B. In this event, the transistor $TR_3$ is rendered conductive to thereby establish a discharge path for the capacitor 13. Consequently, the bias potential which had been stored on the capacitor 13 is now discharged through the conducting transistor $TR_3$ to thereby reduce the stored bias potential. Nevertheless, the voltage stored across the capacitor 13 is supplied through the base-emitter junctions of the transistors $TR_5$ and $TR_6$ to the junction $l_1$. However, as the stored voltage now is discharging through the transistor $TR_3$, the bias potential fed back to the junction $l_1$ is likewise diminishing. Thus, for the case wherein the synchronizing pulse peak exceeds the reference level $E_R$, the DC bias potential produced by the source 12 is subtractively combined with the video signal $S_v{'}$. This has the effect of reducing the synchronizing pulse peak $S_{H1}$ at the junction $l_1$ as a direct function of the discharging of the capacitor 13. Of course, when the synchronizing pulse level has been reduced to the reference level $E_R$, the transistor $TR_3$ is rendered non-conductive. Accordingly, the capacitor 13 no longer is discharged and, indeed, now is permitted to charge toward the operating potential level.

Thus, it is seen that when the synchronizing pulse peak of the input video signal $S_v$ exceeds the predetermined level, the synchronizing pulse peak of the video signal $S_v{'}$ is varied so as to be clamped to the reference level $E_R$. It may be appreciated that, for all levels of the synchronizing pulse peak in the input video signal $S_v$, the synchronizing pulses of the video signal $S_v{'}$ at the junction $l_1$ are clamped to the constant reference level $E_R$. Hence, the DC level is restored to the video signal $S_v{'}$ which is supplied to the buffer amplifier transistor $TR_2$ and the synchronizing signal peaks of the output video signal $S_o$ derived at the output terminal 5 are maintained substantially constant as is clearly shown in the waveforms of FIG. 2C.

It should be appreciated that the discharge time constant for the bias potential source 12 is a function of the collector-emitter impedance of the transistor $TR_3$ and the resistance value of the resistor 7. Hence, this discharge time constant may be judiciously selected, as desired. Of course, since the collector-emitter impedance of the transistor $TR_3$ is a function of the conductivity thereof which, in turn, depends upon the amount by which the voltage applied thereto exceeds the reference level $E_R$, it is seen that the bias potential produced by the source 12 and derived at the junction $l_2$ will be rapidly discharged if the peak levels of the video signal $S_v{'}$ are great. Also, the charging time constant of the bias potential source 12 is a function of the resistance value of the resistor 11. Preferably, the voltage stored by the capacitor 13 at the beginning of each synchronizing pulse interval is at or near its maximum value. This is attained if the charging time constant is less than a video signal horizontal line interval.

The temperature characteristics of the illustrated DC level control circuit now will be described. The gain of the input transistor amplifier $TR_1$ can be approximated as a function of the resistance value of the collector resistor 14 divided by the resistance value of the emitter resistor 2. As a general example, let it be assumed that the respective resistance values are selected such that the gain of the input amplifier is n. Now, if the base-emitter voltage $V_{BE}$ of the illustrated transistors is changed by an amount equal to $+\Delta V_{BE}$ by reason of a change in temperature, then the corresponding voltage change at the collector electrode of the transistor $TR_1$ is approximately equal to $-n\Delta V_{BE}$.

In accordance with this general example, let it be assumed that m cascaded transistors are provided in the feedback path between the bias potential source 12 and the junction $l_1$. Thus, a total of m base-emitter junctions are provided in this feedback path so that the change in the bias potential fed back to the junction $l_1$ by reason of the temperature variation is equal to $+m\Delta V_{BE}$. This is seen to lower the temperature-related change in the potential at the junction $l_1$ which is caused by the transistor $TR_1$. Finally, if the emitter-follower buffer amplifier is assumed to include $(n-m)$ emitter-follower transistors, then the video signal $S_v{'}$ which is transmitted through the buffer amplifier is subjected to a further potential change of $+(n-m)\Delta V_{BE}$. The total change in DC potential caused by a temperature variation thus is reduced to zero. That is, the respective base-emitter junctions of the transistors result in a cancellation of these potential changes $\Delta V_{BE}$.

In the illustrated embodiment, the gain of the input transistor amplifier $TR_1$ may be established to be equal to 3 such that temperature variations result in a potential change of $-3\Delta V_{BE}$ at the junction $l_1$. This potential change is reduced to $-\Delta V_{BE}$ by the potential change resulting from the base-emitter junctions of the transistors $TR_5$ and $TR_6$. This potential change of $-\Delta V_{BE}$ at the base electrode of the transistor $TR_2$ is fully cancelled by the potential change $+\Delta V_{BE}$ across this transistor. Therefore, it is seen that variations in the base-emitter junctions of the respective transistors because of temperature variations have no affect upon the DC level of the output signal produced at the output terminal 5.

Figure 4:
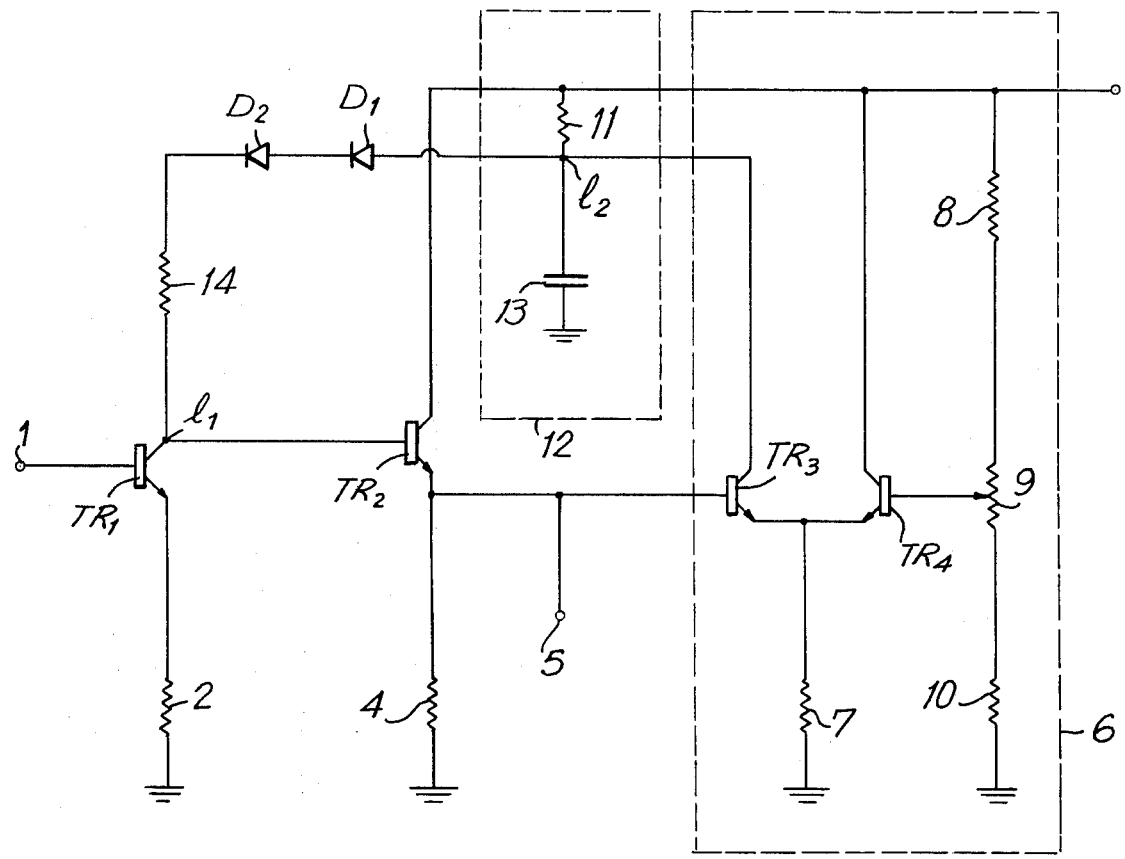
FIG. 4 shows a schematic diagram of a DC level control circuit in accordance with another embodiment of this invention.

In view of the foregoing, it may be appreciated that the described temperature characteristics can be achieved by substituting other semiconductor devices for the transistors $TR_5$ and $TR_6$. For example, these transistors may be replaced by diodes $D_1$ and $D_2$ shown in detail in FIG. 4 and having respective voltage drops thereacross equal to a base-emitter junction voltage $V_{BE}$. Other semiconductor devices having PN junctions with equivalent junction voltages can be used.

Although the foregoing description of the illustrated embodiments has shown that the bias potential produced by the source 12 can be additively and subtractively combined with the signal $S_v{'}$ having positive-going synchronizing pulse peaks, it is contemplated that the bias potential source can be used to supply a negative bias potential to a video signal having negative-going synchronizing pulse peaks. Thus, irrespective of the polarity of the input signal, the feedback clamping circuit of this invention serves to add or subtract a DC bias level to the input signal to thereby restore a desired DC level thereto. That is, when the transistor $TR_3$ is not conducting, it is assumed that the DC level of the input signal is too low. Hence, a maximum DC bias potential is supplied by the bias potential source 12 to correspondingly increase the DC level of the input signal. Conversely, the transistor $TR_3$ is rendered conductive when the DC level of the the input signal is too large. In that event, a smaller DC bias potential is supplied by the bias potential source 12 to correspondingly reduce the DC level of the input signal.

Figure 3:
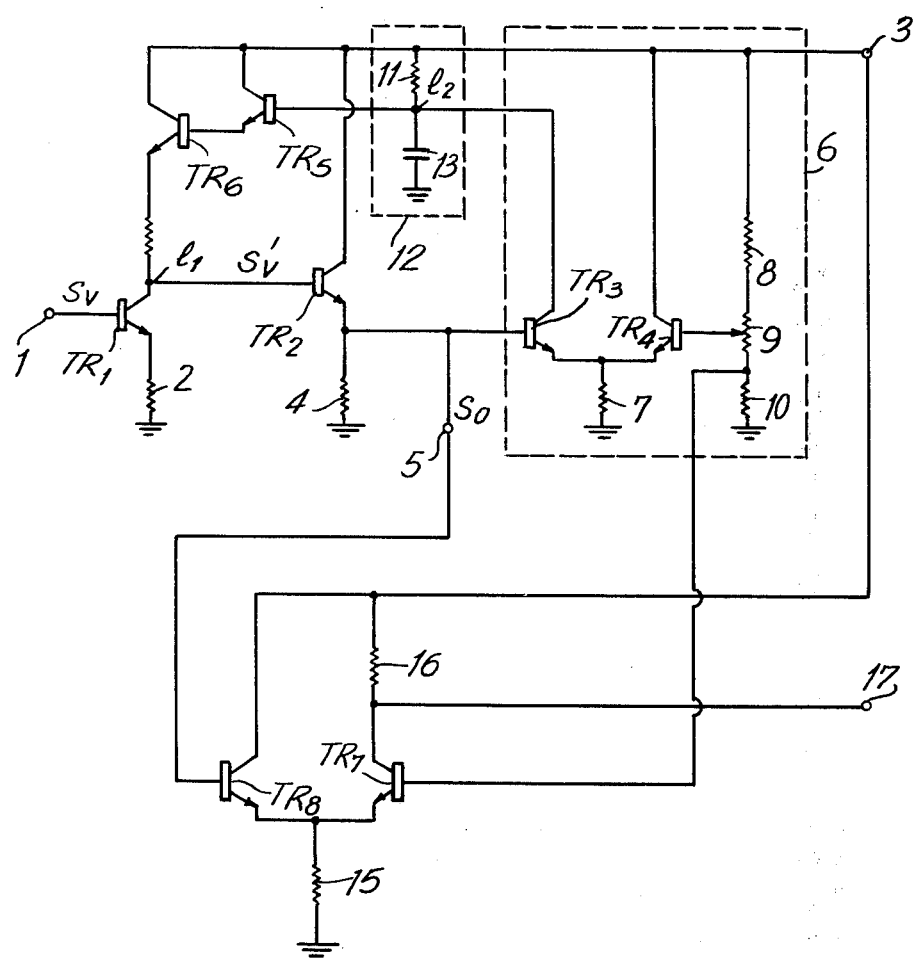
FIG. 3 shows one application of the DC level control circuit in accordance with this invention for use in combination with a synchronizing signal separator circuit.

The DC level control circuit of this invention can be readily used as the preparatory stage for a synchronizing signal separator. As shown in FIG. 3, the output video signal $S_o$ produced at the output terminal 5, which is level-controlled as described hereinabove, can be supplied to a synchronizing signal pulse separator formed of a differential amplifier comprised of the differentially-connected stages $TR_7$ and $TR_8$. These transistors have their emitter electrodes connected in common, the common-connected emitters being coupled to ground by a resistor 15. This differential amplifier is adapted to compare the uniform level synchronizing pulses included in the output video signal $S_o$ with a threshold level. Accordingly, the base electrode of the transistor $TR_7$ is supplied with a threshold voltage derived from the aforedescribed voltage divider circuit. As one example thereof, the base electrode of the transistor $TR_7$ is connected to the junction defined by the series-connected resistors 9 and 10. The base electrode of the transistor $TR_8$ is connected to the output terminal 5 so as to receive the output video signal $S_o$. To complete the circuit connections of the synchronizing signal separator circuit, the operating potential applied to the terminal 3 is supplied directly to the collector electrode of the transistor $TR_8$ and is supplied through a load resistor 16 to the collector electrode of the transistor $TR_7$, the latter electrode being connected to a separator output terminal 17.

Since the DC level control circuit illustrated in FIG. 3 is identical to the level control circuit described hereinabove with respect to FIG. 1, further description thereof need not be provided.

In operation, it is appreciated that the video signal supplied to the separator circuit is of the type depicted by the waveform $S_o$ in FIG. 2C. Let it be assumed that the threshold level to which this video signal is compared is equal to the threshold voltage $E_S$, shown by the broken line in FIG. 2C. As is seen, the threshold level $E_S$ is less than the reference level $E_R$. However, it should be fully appreciated that the threshold level $E_S$ is greater than the highest video information level which is contained in the signal $S_o$. That is, the threshold level can be considered to be "blacker than black."

Figure 2D:
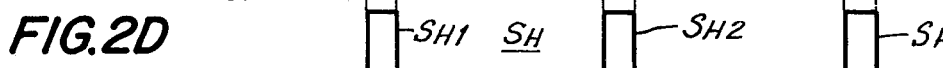

Since the synchronizing pulse peaks included in the video output signal $S_o$ now are at the uniform level of $E_R$, it may be appreciated that the voltage applied to the base electrode of the transistor $TR_8$ will exceed the threshold voltage $E_S$ applied to the base electrode of the transistor $TR_7$ only during the synchronizing pulse duration. Thus, only during these durations will the transistor $TR_8$ be conductive. Consequently, the transistor $TR_7$ is rendered non-conductive during the synchronizing pulse durations, resulting in an output train of synchronizing pulses $S_H$ at the output terminal 17, as shown in FIG. 2D.

It is appreciated that if the input video signal has been applied to the synchronizing signal separator without first being level adjusted by the DC level control circuit of this invention, it is most probable that some of the synchronizing pulse peaks would not exceed the threshold level $E_S$ and thus would not be detected. Also, it is possible that some of the video information included in the input video signal $S_v$ might exceed the threshold level, resulting in an erroneous detection of this information as being a synchronizing pulse. Therefore, by reason of the improved DC level control circuit described hereinabove, errors which would result from false detections or omissions of synchronizing pulses are avoided.

While the invention has been particularly shown and described with reference to a preferred embodiment having a particular application in video signal processing apparatus, it will be obvious to those skilled in the art that this invention may be utilized with any apparatus wherein the DC level of a signal is to be controlled, or clamped, to any desired level. Consequently, it is apparent that the foregoing and various other changes and modifications in form and details may be made without departing from the spirit and scope of the invention. It is therefore intended that the appended claims be interpreted as including all such changes and modifications.

What is claimed is:
1. A DC level control circuit, comprising:
   input means for receiving an input video signal having synchronizing signal pulses;
   first comparison means coupled to said input means, for receiving said input signal and for comparing the DC level of said synchronizing signal pulses to a reference level;
   feedback means coupled between said first comparison means and said input means and including means for providing a DC bias potential, said DC bias potential being varied in accordance with said first comparison between said input signal DC level and said reference level and fed back to supply an additive bias potential to increase the level of said synchronizing signal pulses when said input synchronizing signal pulse is less than said reference level and a subtractive bias potential to decrease the level of said synchronizing signal pulses when said input synchronizing signal pulse is greater than said reference level; and
   synchronizing signal pulse separator means coupled to said input means for receiving said varied DC level video signal, said synchronizing signal pulse separator comprises second comparison means for receiving said video signal having synchronizing signal pulses substantially equal to said reference level and for comparing said video signal to a threshold level to produce output synchronizing pulses when said video signal exceeds said threshold level.

2. A DC level control circuit in accordance with claim 1 wherein said second comparison means comprises a differential amplifier including a pair of differentially-connected transistor stages, one of said stages being supplied with a threshold voltage less than said reference level and the other of said stages being supplied with said varied DC level video signal.

3. A DC level control circuit which is substantially insensitive to temperature variations, comprising:

amplifier means for amplifying an input signal with a magnitude of gain n;

comparison means for comparing the DC level of a predetermined portion of the amplified signal to a reference level;

emitter-follower means for supplying said amplified signal to said comparison means;

means coupled to said comparison means for providing a DC bias potential, said DC bias potential being varied in accordance with said comparison between said amplified signal DC level and said reference level;

feedback means comprised of m cascaded semiconductor PN junctions for coupling said DC bias potential to the emitter-follower means input so as to correspondingly vary the DC level of said amplified signal; wherein m and n are numbers and the sum of m and the number of stages included in said emitter-follower means is equal to $n$; and output means coupled to said emitter-follower means for receiving said amplified signal.

4. A DC level control circuit in accordance with claim 3 wherein said semiconductor PN junctions are emitter-follower transistors.

5. A DC level control circuit in accordance with claim 3 wherein said semiconductor PN junctions are diodes.

* * * * *